United States Patent [19]
Doty

[11] 4,330,774
[45] May 18, 1982

[54] TIRE PRESSURE SENSING SYSTEM

[75] Inventor: Gerald A. Doty, Crown Point, Ind.

[73] Assignee: Gateway Industries, Inc., Chicago, Ill.

[21] Appl. No.: 122,288

[22] Filed: Feb. 19, 1980

[51] Int. Cl.³ .............................................. B60C 23/02
[52] U.S. Cl. .................................. 340/58; 200/61.25; 116/34 R
[58] Field of Search ............ 340/58; 200/61.22, 61.25; 116/34 R

[56] References Cited

U.S. PATENT DOCUMENTS

| | | | |
|---|---|---|---|
| 3,651,455 | 3/1972 | Hurlbutt et al. | 340/58 |
| 3,715,719 | 2/1973 | Sugiyama | 340/58 |
| 3,961,309 | 6/1976 | Eddy | 340/58 |

*Primary Examiner*—Alvin H. Waring
*Attorney, Agent, or Firm*—Fitch, Even, Tabin, Flannery & Welsh

[57] ABSTRACT

A pressure indicating system for continually monitoring tire pressure in a moving vehicle in which a pressure sensing means attached to the wheel activates an alarm to alert a driver that the pressure in one of his tires is abnormally low. A magnet is shifted by the pressure sensing means to activate a Hall effect switch located on a non-rotating portion of the vehicle to trigger the alarm.

The pressure sensing means also acts to relieve high pressure above a predetermined pressure from the tire to prevent over pressurizing of the tire. The alarm indicates which of the tires is at low pressure and preferably comprises an inexpensive electronic system having a flashing light for indicating which tire is at low pressure.

26 Claims, 7 Drawing Figures

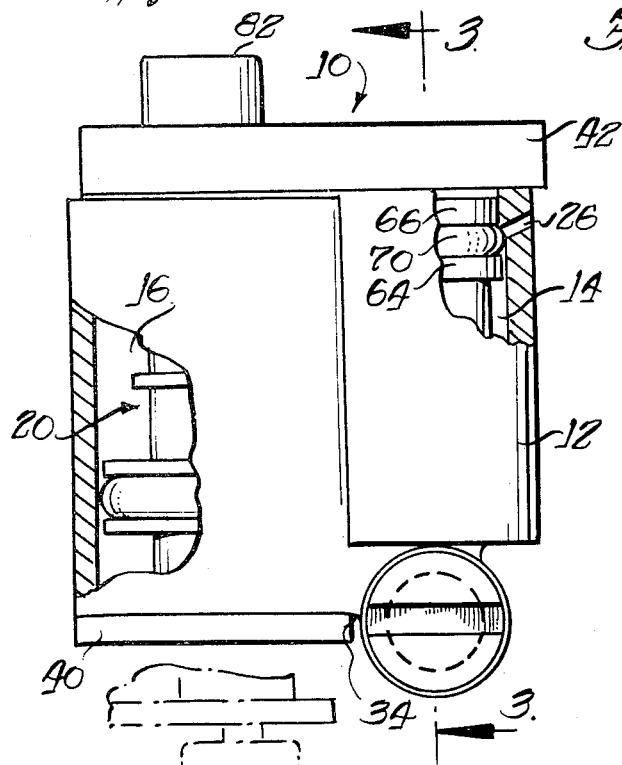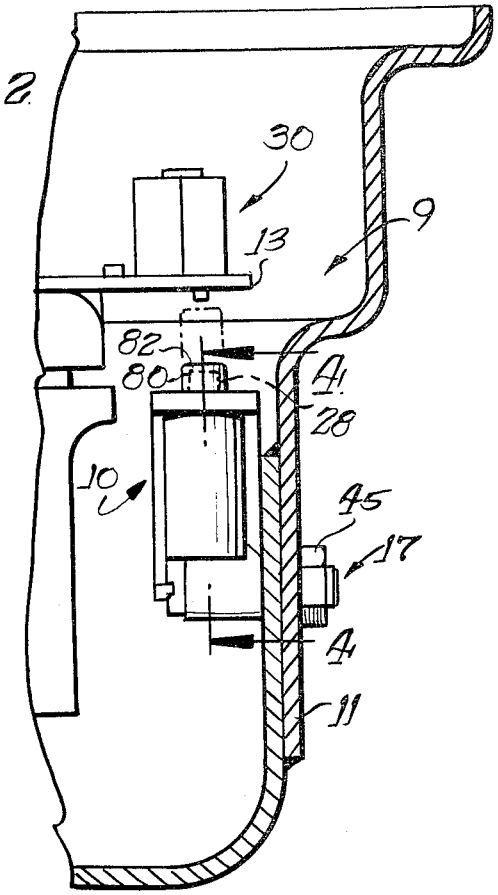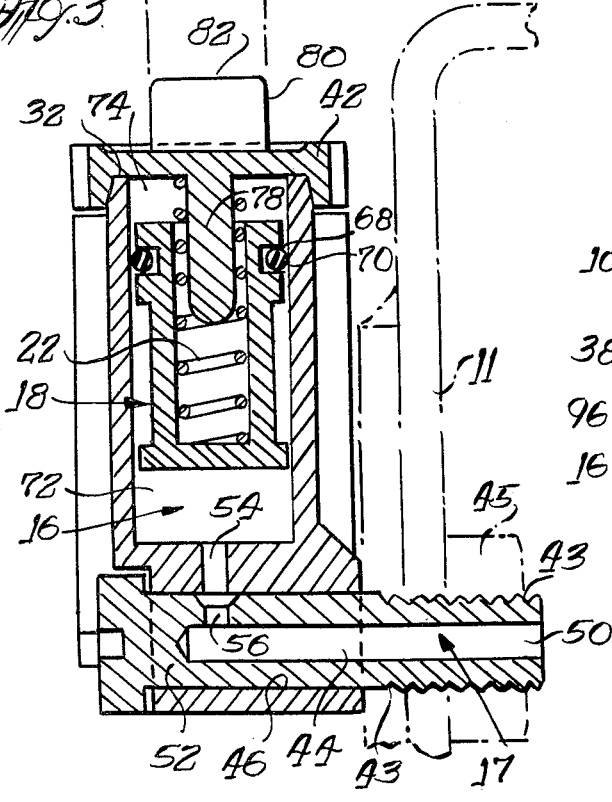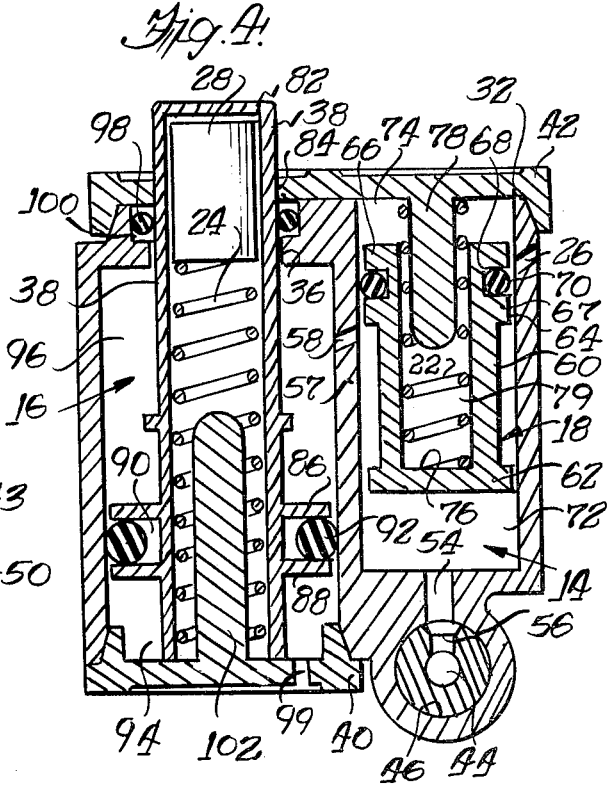

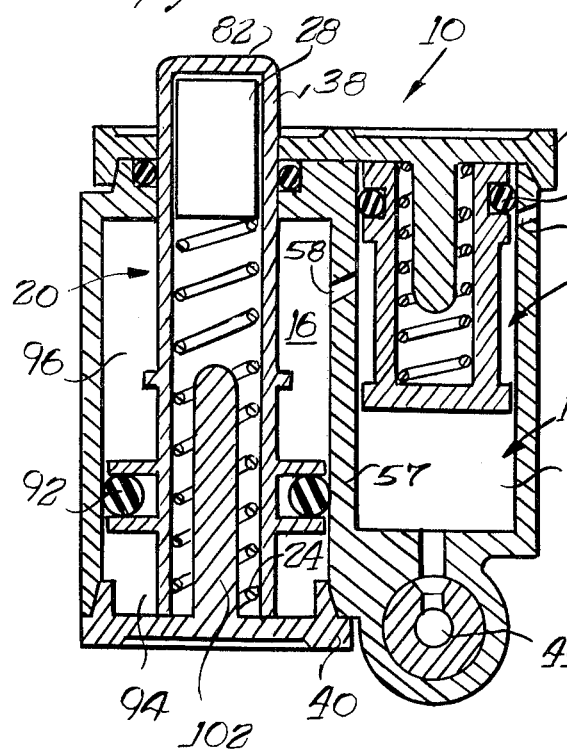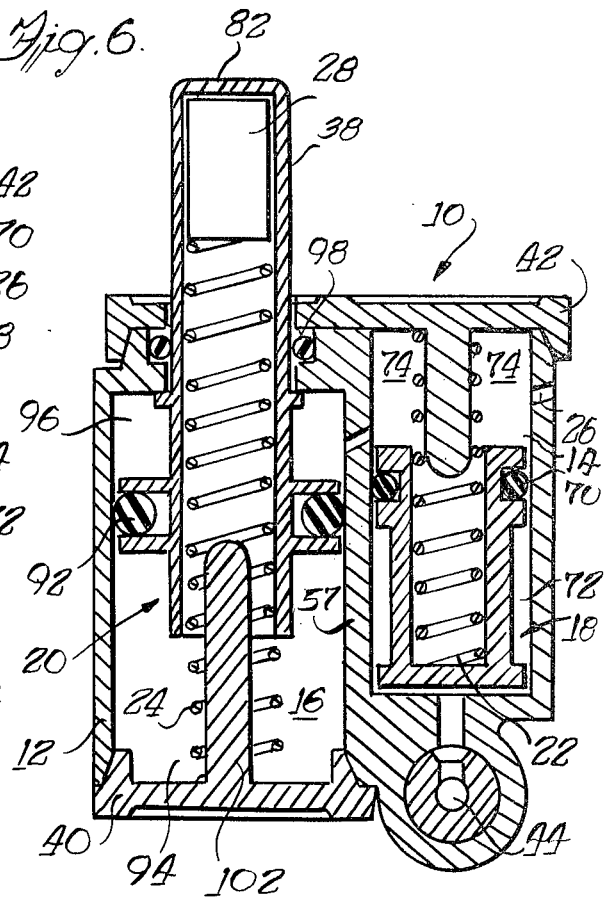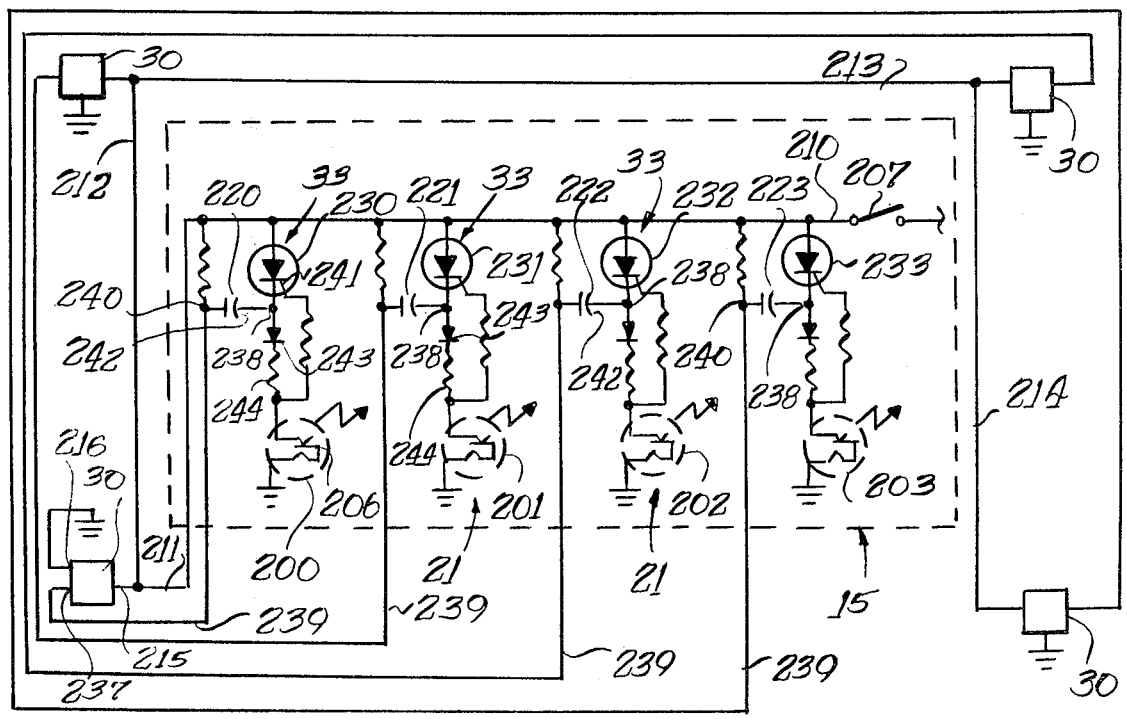

TIRE PRESSURE SENSING SYSTEM

The present invention relates to systems for indicating tire air pressure and more particularly for indicating abnormal tire pressure to a driver of a moving vehicle.

Overinflation or underinflation of pneumatic tires creates both safety and economical problems. Improper inflation of tires not only causes reduced mileage, but causes uneven wear on tires and may lead to their rapid deterioration. Over or under inflation may lead to tire blow outs and/or loss of control of the vehicle resulting in highway accidents.

While the measurement of tire pressure on a stationary vehicle is a simple matter, it is a matter which is often neglected. Even when tire pressures are checked regularly, a driver ordinarily has no indication that his tire pressure is or has changed as he drives. A slow leak may develop during a trip creating a hazard which may manifest itself in an emergency situation. Accordingly, it is desireable to have a method of constantly monitoring tire pressure so that the driver is made aware that his tire pressure has fallen below acceptable limits while he is driving.

While there is ordinarily no particular reason for tire pressures to exceed acceptable limits, careless inflation of tires or overheating of tires may result in overinflation which may result in tire blow out. Accordingly, it would also be desireable to have a device which prevents or alleviates overinflation.

Numerous tire pressure monitoring devices have been proposed. Some, such as that proposed in U.S. Pat. No. 4,059,823 are entirely self-contained and may contain therein a battery which activates a signal device which may be observed by visual inspection of the outside of the vehicle. While facilitating the reading of tire pressure, such a device will not warn the driver of a low tire condition while the vehicle is in motion. Furthermore, if the battery is not regularly checked, it may fail and the device will not operate and may provide false security to one who relies on such a device. Also, batteries are costly items. It is preferable to have a tire monitoring system which is energized by the electrical system of the vehicle and furthermore may be read inside the vehicle.

In order to provide tire pressure information to occupants of a vehicle, a tire pressure monitoring system attached to a rapidly rotating wheel must provide a signal to the occupant compartment of the vehicle. A major problem in devising such a system is effecting transfer of a signal from a pressure sensing or gauge means on the rotating wheel to the non-rotating portion of the vehicle in a manner which is reliable and relatively inexpensive. Various methods to accomplish signal transfer have been devised. Many of these have serious drawbacks either in cost, efficiency or in reliability.

Pressure monitoring systems have employed radio transmitters which transmit information from a wheel to an alarm means in the interior of the vehicle. An example of such a device is described in U.S. Pat. No. 3,329,934. Such systems are costly and signals therefrom may be subject to interference. Furthermore, stray electrical signals may falsely trigger alarms in such devices. It has been proposed to use means, such as slip rings, to transfer signals from a pressure gauge means on a wheel to the non-moving parts of the vehicle, but such require basic modifications of the wheel-axle assembly and furthermore, are subject to continuous wear.

Systems have been disclosed, such as that described in U.S. Pat. No. 4,004,271, wherein a magnetic member of a pressure gauge is disposed in close proximity to a magnetically activated reed type switch located on a stationary member of the vehicle. The reed type switch activates an alarm to alert the driver that his tire pressure is low. When a driver is appraised of the situation he may continue to drive to a gas station to inflate the tire. On each revolution of the wheel the magnetic member of the gauge passes in proximity to the reed type switch, reactivating the switch. Accordingly, the reed type switch fluctuates rapidly back and forth causing wear and possible failure due to fatique on the switch. The reed switch on such a device may quickly wear out and may provide false security to a driver expecting to be warned of low pressure in his tires.

Still other devices may employ sophisticated computing means to estimate tire pressure by various indirect measurements such as by comparing the number of rotations of wheels on either side of the car. The cost of expensive computing means for measurements of dubious value is not justified for a straight forward measurement such as air pressure.

It is a primary object of the present invention to provide a monitoring system for vehicle tire pressure which is relatively inexpensive and highly reliable to alert the driver of a moving vehicle that his tire pressure is low. It is a further object of this invention to provide a means whereby over-inflated tires are automatically bled of excess air.

Other objects and advantages of the invention will become apparent from the following detailed description when taken in conjunction with the accompanying drawings in which:

FIG. 1 is a front elevation view, partially cut away, of a pressure sensing means used in the pressure sensing system.

FIG. 2 is a pressure sensing means mounted on the wheel of a vehicle and a Hall effect switch mounted on a non-rotating portion of the vehicle.

FIG. 3 is a cross sectional view of the pressure sensing means taken along line 3—3 of FIG. 1.

FIG. 4 is a cross sectional view of the pressure sensing means in the normal pressure position taken along line 4—4 of FIG. 2.

FIG. 5 is the pressure sensing means as shown in FIG. 4 is the high pressure position.

FIG. 6 is the pressure sensing means as shown in FIG. 4 in the low pressure position.

FIG. 7 is a diagramatic view of the electrical circuitry for the pressure sensing system.

As shown in the drawings for purposes of illustration, the invention is embodied in a pressure indicating system 9 for a vehicle wheel 11 which carries a pressure sensing means 10 thereon for actuating a switching means 30 mounted on the brake drum or other non-rotating adjacent part 13 of a vehicle to actuate an alarm means 15 (FIG. 7) which is usually located on the vehicle driver's location so that the driver is warned of a low tire pressure condition. The pressure sensing means 10 is secured to the rotating wheel 11 and has an air inlet 17 extending in fluid communication to the hollow interior of the tire. Since most vehicles have at least four tires, it is preferred to have a pressure sensing means 10 carried by each of the four wheels 11 and to have four switching means 30, one being adjacent each of the wheels. To indicate to the driver which of the tires is low pressure, the preferred alarm means 15 has four signal lights 21 (FIG. 7) each associated with a switch means 30 to indicate which tire has low pressure. Manifestly, where the number of tires and wheels is greater than four, as with trailer trucks, the signal means may include a signal light for each wheel to indicate the location of the low pressure to the driver.

It will be appreciated that cost of the electronics is an important factor when having as many as sixteen to eighteen wheels on a big trailer truck. Also, the problem of performance is difficult because of the fact that the tire and wheel rotate an abnormally high number of times per unit of time when traveling at high speeds and because the driver may travel fairly long distances before he reaches a place where he can have the air in the tire boosted to the proper pressure. The environment is also generally hostile to electronics as the wheels must go through rain and snow and be subjected to hot and cold temperatures as well as to mud and dirt. Thus, there is a need for a new and improved tire pressure indicating system which can operate, satisfactorily and can meet the various requirements to be a commercially acceptable system.

In accordance with the present invention, the problem of switch life and reliability has been overcome by providing a solid state switch means 30 such as a Hall effect switch and a magnet means 28 operable by the pressure means to actuate the Hall effect switch whenever the tire pressure becomes too low. The Hall effect switch may be operated for a high number of operations without quickly wearing out as will the conventional reed switch which would open and close mechanical contacts on each revolution of the wheel when a tire has low pressure. Also, the Hall effect switches may be incorporated in the alarm means 15 which can be made inexpensively by using inexpensive signal lights 21 and an SCR network 33 with each light 21, as will be explained in greater detail hereinafter.

In accordance with another and important aspect of the invention, the pressure sensing means 10 may also bleed off excess air if the air pressure in the tire becomes excessive, e.g., by the tire overheating. This is achieved by the pressure sensing means 10 which has a first pressure responsive means, preferably a first piston 18 on a first piston chamber 14, for detecting high, normal and low tire pressure and having a bleed means 26 associated with the first pressure responsive means to bleed air from the tire when the tire pressure is high. Herein, the pressure sensing means 10 also includes a second pressure responsive means, preferably in the form of a second piston chamber 16 having a second piston 20 therein. The second piston 20 serves as an actuator for the magnet 28 to operate the Hall effect switch means 30 when the tire pressure is low. More particularly, the second piston 20 shifts from the normal pressure position, shown in FIG. 4, with the magnet means 28 spaced from its Hall effect switch to the low pressure position shown in FIG. 6, in which the piston is extended to place the magnet adjacent the Hall effect switch turning the same to an "on" condition.

To further understand the present invention, the present invention will now be described in greater detail.

As best seen in FIG. 4, the piston chambers 14 and 16 of the tire pressure gauge 10 are generally right circular cylinders and are located side-by-side in the unitary housing 12. The first piston chamber 14 is open at a second end 32 of the housing 12 to receive therein the first piston 18, and the second piston chamber 16 is open at a first end 34 (FIG. 1) of the housing 12 to receive therein the second piston 20. A smaller opening 36 at the second end of the second chamber 16 permits the shaft 38 of the second piston 20 to extend therethrough. A first end plate 40 and a second end plate 42 retain the pistons in the chambers. The first end plate 40 covers off the open end of the second chamber 16 and the second end plate 42 covers the entire second end of the housing 12 and closes off the open end of the first chamber 14.

The housing 12 is secured to the wheel 11 by means of a threaded shaft 43 connected at one end to the housing 12 and having its other threaded end projecting through an aperture in the wheel (FIGS. 2 and 3) to receive a lock nut or fastener 45. The threaded shaft 43 has an inlet bore 44. Air pressure from the tire is communicated through the inlet bore 44 of the threaded shaft 43 which is received in a socket 46 located in the housing 12 proximal to the first end of the first chamber 14 and as shown in FIGS. 1 through 7 may be disposed perpendicular to the plane containing the axes of the piston chambers 14 and 16. The axial bore 44 of the shaft 43 extends to a cross vent 56 which is coaxially aligned with an air inlet passageway 54 which communicates the first chamber 14 with the axial bore 44.

The air bleeding means for venting excess air from the first chamber 14 to the ambient atmosphere is preferably in the form of an orifice 26 which is located toward the second end of the housing 12. A common wall 57 separates the piston chambers 14 and 16 and is provided with an orifice or passageway 58 which communicates the first and second chambers. The orifice 26 and passageway 58 as shown are coaxial, being formed from a single drilling operation carried out at an angle to the chamber axes.

As best seen in FIG. 4, the first piston 18 is comprised of a generally cylindrical tubular shaft 60, the diameter of which is less than the interior diameter of the chamber 14. A generally circular end piece 62 is located at the first end of the first piston 18 to cover the first end of the tubular shaft 60. The end piece has a diameter slightly less than the interior diameter of the chamber 14 which locates the piston 18 laterally within the chamber 14 but allows air to flow therearound.

The first piston 18 slides within its piston chamber 14 and has a sealing end 67 which divides the piston chamber into two different pressure sections 72 and 74. To this end, a first annular ring 64 is spaced from a second annular ring 66 on the outer wall thereof to define an annular groove 68 therebetween. A flexible "O" ring 70 seats in the annular groove 68 and against the chamber 14 wall and divides the first chamber 14 into the lower or first pressure section 72 toward the first end of the housing and the upper or second ambient section 74 at the second end of the housing. The second end plate 42 retains the first piston 18 within the first chamber 14.

Opposing the tire air pressure pushing on the end 62 of the first piston 18 is a biasing means in the form of a first coiled contractile spring 22 located in the ambient pressure section 74. One end of the spring 22 abuts housing end plate 42 and the other end of the spring extends into a bore in the piston 18 to abut an end surface 76 on the upper side of end piece 62 of the piston 18. A protruding finger 78, around which the spring is disposed, depends from the second end plate 42 and is integral therewith. The finger 78 is coaxially aligned with the spring receiving bore 79 in the piston and projects therein and serves to position the spring 22 in correct orientation.

The first spring 22 is carefully selected according to the desired pressure of the tire. Various models of the tire gauge 10 may be provided with springs 22 of varying strength depending on the pressure specified for the tire. The spring 22 is selected so that when the pressure of the tire is within a desired range, the first piston 18 is positioned intermediate the ends of the chamber 14 (FIG. 4) with the sealing "O" ring 70 blocking flow of high pressure air from the first pressure section 72 to the air bleeding vent 26 but allows passage of high pressure air into the second piston chamber 16 through the passageway 58. Low pressure ambient air appears on the other or upper side of the "O" ring from the vent 26.

The range of normal pressure of the gauge 10 is determined both by the strength of the spring 22, area of the piston and by the relative spacing in the direction along the cylindrical axes of the passageway 58 and the orifice 26. While the range of normal pressure is selected to keep the tire inflated within safe limits, the range is sufficiently broad to allow for normal pressure changes of the tire as the tire heats up and cools during use with the upper limit generally being at least 4 or 5 psi higher than the lower limit.

If the tire is overinflated, the pressure in the pressure section 72 of the first chamber 14 will overcome the biasing force of the spring 22 and shift the piston 18 toward or against the second end plate 42, as best seen in FIG. 5, so that the sealing "O" ring 70 is positioned behind the orifice 26 thereby communicating the tire with the ambient atmosphere. Excess pressure is thereby bled off until the tire pressure becomes sufficiently low that the spring 22 shifts first piston 18 a sufficient distance to move the sealing "O" ring 70 toward the first end side of the orifice 26 to close off communication between the tire and the ambient atmosphere, as shown in FIG. 4.

The second piston 20 is a generally cylindrical tube 38 substantially smaller in diameter than the second chamber 16. A closed outer end 82 on the tube 38 extends through the opening 36 at the second end of the second chamber 16 and through a coaxial opening 84 in the second end plate 42. The magnet 28 is held by the spring 24 in the end 82 of the second piston 20. A first annular flange 86 and a second annular flange 88 are formed on the sides of the second piston 20 to guide the second piston 20 for rectilinear travel in the second chamber 16 and to provide an annular groove 90 to seat an "O" 92 ring therein. The "O" ring 92 divides the second chamber 16 into a first ambient section 94 and a second pressure section 96. An "O" ring 98 is located in an annular countersink 100 in the housing 12 around the protruding free end 82 of the piston. The "O" ring 98 is retained in the countersink 100 by the second end plate 42. The "O" ring 98 seals against pressure loss from the second pressure section 96 of the second chamber 16 along the piston end 82. The first end plate 40, which covers the open end of the second chamber 16, has an orifice 99 (FIG. 4) which permits air flow into or from the chamber 16 to maintain the air in the ambient volume section 94 at ambient pressures.

The second pressure section 96 is exposed to the tire pressure at high or normal tire pressures as tire air flows into the first chamber 14 and about the first piston end 62 and through the orifice 58, as shown in FIGS. 4 and 5. While the "O" ring 92 on the second piston 20 moves forward or backward, it is at all times located between the lower or first end 34 of the housing 12 and the passageway 58. The passageway 58 accordingly is always in communication with the pressure section 96 of the second chamber 16. Thus, when the tire is inflated to normal or excess pressure, the pressure sections 72 and 96 of the first and second piston chambers 14 and 16 are both in communication with the tire.

The tire pressure, which urges the second piston 20 toward the first end plate 40, is opposed by the spring 24 which is located in the interior of the piston tubular wall 38. The spring 24 is sufficiently weak that normal tire pressure in the pressurized section 96 of the second chamber 16 compresses the spring 24 sufficiently to hold the second piston 20 in its retracted or non-actuating position, as shown in FIG. 4.

The spring 24 is a compressed, coiled contractile spring guided by a longitudinal spring guide or finger 102, around which the second spring 24 locates, projecting upward therefrom and extending into the tubular bore of the second piston 20. The finger 102 guides the spring 24 and maintains the spring 24 in correct orientation. One end of the spring abuts the end plate 40 and the other end abuts the magnet 28 (FIG. 4).

When the air pressure in the tire falls below the predetermined level, the spring 22 is able to force the first piston down, as shown in FIG. 6, against the tire air to a position in which the sealing "O" ring, 70, around the first piston 18 is disposed below the passageway 58 and thus allows high pressure air in the chamber section 96 to flow through the passageway 58 and through the vent 26 to lower the air pressure in the chamber section 96 to ambient pressure. Because the ambient air pressure is less than the tire air pressure for an inflated tire, the second spring 24 is now free to expand and move the second piston 20 to extend its end 82 and carry the magnet 28 to a switch actuating postion (FIG. 6).

The Hall effect switch 30 employed in the present invention acts as a switch movable between an "open" or no current carrying position and a "closed" or current carrying position without the use of moving parts and, hence, is particularly suitable for a pressure sensing system in which the switch is actuated by the magnetic member 28 on each revolution of the wheel 11 when the tire pressure is low.

Herein, the alarm means 15 is triggered whenever low pressure in the tire causes the magnetic member 28 to actuate the Hall effect switch means 30. While various signal means may be employed, i.e., a buzzer, to alert a driver to low tire pressure, it is preferred to use signal lights 21 and it is preferred to have a blinking light signal to draw attention and to distinguish from other warning systems located on a vehicle dashboard. In accordance with the present invention, the preferred signal lights 21 are in the form of four blinking signal lights 200, 201, 202 and 203 (FIG. 7) are each associated with one of the respective tires and Hall effect switches 30. The blinking of a light will have associated therewith indicia identifying the particular wheel at which the tire pressure is below the normal pressure valve.

It will be appreciated that the tire and wheel are rotating at high revolutions when the vehicle is traveling down the highway at a high speed, such as, 55-miles per hour and that the number of times the magnet 28 passes its associated Hall effect switch means 30 per minute is quite high. Thus, there is a need to have a circuit which provides a visible signal but, which does not flash on and off each time the magnet 28 passes the Hall effect switch 30 because such a rapidly blinking light would in all probability be lost to the vision of the driver at high speeds. To achieve a visable signal the current provided to the light should be continuous over a plurality of revolutions of the wheel.

The preferred circuit is intended to be manufactured at a most economical cost as contrasted to very complex and expensive circuits hereto proposed. To this end it is preferred that the signal lights 200-203 be the common thermal switch type bulb such as can be bought from General Electric Corporation, under their designation "G.E. 455" or flasher type bulbs. Such bulbs when turned on stay on for a predetermined period of time until a thermal thermostatic switch 206 therein opens to break the circuit through the bulb, and it takes a predetermined period of time for that thermal switch to again close. As will be explained in greater detail hereinafter, the initial activation of a Hall effect switch 30 associated with a signal light causes the signal light to turn on and it remains turned on even though a successive number of activation and deactivations occur subsequently. Once the thermostatic switch 206 opens, it stays open and the bulb remains off until the switch 206 cools down and recloses, at which time, the next succeeding activation of the Hall effect switch 30 by the magnet 28 is again effective to turn on the bulb. Of course, this occurs repetitively providing a blinking signal for a low-pressure tire.

Referring now specifically to the circuit illustrated in FIG. 7, when the ignition switch 207 is closed, it connects the 12-volt circuit of the automobile to common lead 210 which is connected to leads 211, 212, 213 and 214, each of these leading to one of the respective Hall effect switches 30 which supplies the necessary current for the Hall effect switch 30 to be turned on internally through respective points 215, 216 to the respective grounds for each of the Hall effect switches 30. The Hall effect switches 30 are, in a sense, normally open switches when power is being applied thereto by closure of the ignition switch. That is, the current is applied through each Hall effect device 30 to ground and the current is supplying the required power for their internal circuitry. No current is supplied to or drawn from terminal 237 until such time as the magnet 28 activates the Hall effect switch 30 which causes a switching action to effectively short circuit terminal 237 to ground 216.

The closure of the ignition switch 207 also serves to charge each of the respective capacitors 220, 221, 222 and 223. With the capacitors charged, twelve volts from the electrical system of the vehicle will appear at points 240 of each of the capacitors and the points 238 are now at ground potential at the SCR's cathode with the SCR turned off. This is the normal state for the circuit with the ignition switch closed and with the tires at the normal pressure and the Hall switch devices 30 in their effectively open positions.

When a low tire pressure occurs and the magnet 28 activates its associated Hall effect switch 30, the latter effectively connects points 237 and 216. The point 237 is connected by a lead 239 to the capacitor 220 which drops point 240 to ground and, as the capacitor discharges, the gate 241 of the SCR becomes positive with respect to cathode 242 of the SCR. Diodes 243 aid in this action. The SCR turns on, allowing current to flow through it and diode 243 and resistor 244 through the terminal switch 206 in the signal light 200 and to ground. Thus, the signal light 200 will turn on.

Even though the magnet 28 is activating and deactivating the Hall effect switch 30 very quickly, the SCR 230 will remain on because a current greater than the minimum holding current required to keep the SCR turned on is present, due to the load of the signal light 200 operation. But opening of thermal switch will break the holding circuit for the SCR. Thus, when the thermal switch 206 opens, the minimum current for the SCR 230 is no longer available, and SCR 230 shuts off. Then when the thermal switch 206 cools and again closes, the capacitor 220 is recharged and the next operation of the Hall effect switch turns the SCR 230 on.

Thus, after the cooling and closing of the thermal switch, the magnet 28, during the next revolution of the tire again activates the Hall effect switch 30 to connect the points 237 and 216 through the Hall effect switch 30 to ground; and the capacitor 220 will again provide a negative spike to turn on the SCR 230 and thereby the bulb 200 for a second time. Thus, it will be seen that each time the thermal switch opens and closes the wheel moves through a subsequent rotation with the magnet actuating the Hall effect device 30, the light will be turned off and then on to give a "flash" effect. This circuit and these lights provide an inexpensive means to alert the driver of the low pressure in a given tire. Stated differently, it will be seen that due to the nature of this circuit and thermal switch in combination, a blinking light is effected with a minimum number of components.

While the whole invention has been described in terms of a preferred embodiment, modifications obvious to one skilled in the art may be made without departing from the scope of the present invention which is limited only by the following claims:

What is claimed is:

1. A pressure indicating system for continually monitoring tire pressure in a moving vehicle comprising:
    pressure sensing means adapted to be attached to a vehicle wheel in communication with a pneumatic tire,
    a permanent magnet means operable by said pressure sensing means in response to changes in pressure in the tire between a first position when the pressure in the tire is above a predetermined lower limit and a second position when the pressure in the tire falls below said predetermined lower limit,
    a Hall effect magnetic switch means without opening and closing contacts to be carried by a non-rotating portion of the vehicle for activation by said permanent magnet means when said magnet means is in said second position;
    and an alarm system which is turned on when said Hall switch means is activated.

2. A pressure indicating system according to claim 1 also including a vent means to communicate the tire to ambient pressure when pressure in the tire is above a predetermined upper limit and close off said communication when pressure in the tire falls below said upper limit.

3. A pressure indicating system according to claim 1 wherein said alarm system is energized by the electrical system of the vehicle.

4. A pressure indicating system according to claim 1 wherein said Hall switch means goes on and off on each wheel revolution when the tire pressure is low and wherein a circuit means in said alarm system provides a continuous current which is continuous over a plurality of revolutions of the tire.

5. A pressure indicating system for continually monitoring tire pressure in a moving vehicle comprising:
   pressure sensing means attached to a vehicle wheel having a first and a second chamber in mutual communication;
   means communicating said first chamber with the air in the tire;
   first pressure responsive means in said first chambers to detect high, normal and low tire pressure;
   means in said first chamber to bleed air from the tire when the pressure in the tire is above a predetermined limit;
   second pressure responsive means in said second chamber responsive to abnormal tire pressures;
   actuator means operated by said second pressure responsive means at abnormal tire pressures;
   switching means on a non-rotating portion of said vehicle responsive to said actuator means; and
   an alarm means activated by said switching means to alert a driver to abnormal tire pressures.

6. A pressure indicating system according to claim 5 wherein said actuator means is a magnet means and said switching means is a Hall switch responsive to said magnet means.

7. A pressure indicating system according to claim 5 wherein said alarm means is a blinking light.

8. A pressure indicating system according to claim 5 wherein said alarm means is a buzzer.

9. A pressure indicating system according to claim 5 wherein said pressure responsive means are pistons slidably disposed in said chambers.

10. A pressure indicating system according to claim 5 wherein said actuator means is a magnet means.

11. A pressure indicating system according to claim 9 wherein said actuator means is a magnet disposed on said second piston.

12. A pressure indicating system according to claim 9 wherein said first piston moves to open and close communication between the tire and vent means to bleed air from the tire.

13. A pressure indicating system according to claim 5 wherein a passageway interconnects said second chamber to said first chamber and a biasing means in said second chamber moves said actuator means to actuate said switch means when low tire pressure is at said first chamber.

14. A pressure indicating system according to claim 5 wherein a circuit means provides to said alarm means a current which is continuous over a plurality of revolutions of said tire.

15. A pressure indicating system for continually monitoring the tire pressure of a moving vehicle comprising,
   a pressure sensing unit in communication with a pneumatic tire having a first and a second piston chamber and a first and a second piston slidably disposed in said chambers,
   inlet means communicating the tire pressure to one side of the first piston in said first chamber,
   first biasing means to urge said first piston in opposition to pressure from said tire with said piston having a first position when the tire pressure is in a normal range and biasing said first piston to another low pressure position when the tire pressure is below a predetermined pressure, said tire pressure pushing said piston against the urging of said biasing means to a high pressure position,
   means including an orifice to communicate ambient atmosphere to said first chamber when said first piston is in said high pressure position to vent air from the tire, and to communicate ambient atmosphere to said first and second chambers when said first piston is in said low pressure position,
   second biasing means to urge said piston in opposition to pressure in said second chamber, said second biasing means providing insufficient force to overcome tire pressure above said lower predetermined pressure,
   said second biasing means pushing said second piston to the low pressure position when said second chamber is communicating with the ambient atmosphere,
   a magnet means moved by said second piston to an actuating position when pressure in the tire falls below said lower predetermined pressure,
   a Hall switch means located in a non-rotating portion of the vehicle for activation by said magnetic means,
   and an alarm system triggered by said Hall switch means to alert a driver of the vehicle of low pressure in the tire.

16. A pressure indicating system according to claim 15 wherein said alarm system is connected to the electrical system of the vehicle.

17. A pressure indicating system according to claim 15 wherein said alarm system includes a means to provide a continuous current to an alarm means over a plurality of revolutions of a tire.

18. A pressure indicating means according to claim 15 wherein said alarm means is a light bulb.

19. A pressure indicating means according to claim 18 wherein a thermal switch in said light bulb opens and closes to create a blinking effect.

20. A pressure indicating system according to claim 17 wherein said circuit means includes a first path through said Hall switch, and a second path through said Hall switch through which current flows when said Hall switch is activated by said magnet means,
   means including an electric gate means to provide continuous current to said alarm means upon an initial activation by said Hall switch means.

21. A pressure indicating system according to claim 20 wherein a thermal switch interrupts said continuous current.

22. A pressure indicating system in accordance with claim 20 in which a capacitor is connected to said gate means and is charged in such a manner so as to prevent current flow through said gate means so long as current flows through said first path of said Hall switch, but which discharges through said second path to permit current flow through said gate means.

23. A system in accordance with claim 22 wherein a thermal switch is provided in said light bulb and opens after said light bulb reaches a predetermined temperature, the capacitor remains discharged until said thermal switch closes,
   and a subsequent closing of said thermal switch causes charging of the capacitor and the next closing of the Hall switch causes operation of said gate means and lighting of said light bulb.

24. A pressure indicating system for continuing monitoring tire pressure in a moving vehicle comprising a plurality of pressure sensing means each adapted to be connected to a vehicle wheel and to have communication with the pressure inside the tire,
   a plurality of switch means each actuated by said pressure sensing means in response to pressure in the tire falling below a predetermined lower pressure limit, an alarm circuit means including flashing light means each associated with one of the tires for indicating which tire is at low pressure, means connected to said switch means and said flashing light means in said circuit means to provide a continuous current to said flashing light means for a number of revolutions of the tire and for a number of operations of said switch means by said pressure sensing means, and time delay means for de-energizing said flashing light means to extinguish the same and to allow re-energization of said flashing light means upon a subsequent operation of the said switch means by said pressure sensing means.

25. A pressure indicating system in accordance with claim 24 in which said switch means comprising a plurality of Hall effect switches each associated with a tire and each operated by a pressure sensing means.

26. A pressure indicating system in accordance with claim 25 in which said time delay means is a thermostatic switch in said flashing light means and in which said means for providing continuous current includes a silicon controlled rectifier.

* * * * *